United States Patent
Naruse

(10) Patent No.: US 10,780,660 B2
(45) Date of Patent: Sep. 22, 2020

(54) TIRE SEALANT AND TIRE REPAIR KIT

(71) Applicant: THE YOKOHAMA RUBBER CO., LTD., Minato-ku, Tokyo (JP)

(72) Inventor: Masahiro Naruse, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 33 days.

(21) Appl. No.: 16/313,267

(22) PCT Filed: Jun. 26, 2017

(86) PCT No.: PCT/JP2017/023411
§ 371 (c)(1),
(2) Date: Dec. 26, 2018

(87) PCT Pub. No.: WO2018/003745
PCT Pub. Date: Jan. 4, 2018

(65) Prior Publication Data
US 2019/0152174 A1 May 23, 2019

(30) Foreign Application Priority Data

Jun. 29, 2016 (JP) ................. 2016-129059

(51) Int. Cl.
| | |
|---|---|
| B29C 73/16 | (2006.01) |
| C08K 5/053 | (2006.01) |
| B29C 73/02 | (2006.01) |
| C09K 3/10 | (2006.01) |
| C08L 21/02 | (2006.01) |
| C08L 7/02 | (2006.01) |
| B29L 30/00 | (2006.01) |

(52) U.S. Cl.
CPC ............ *B29C 73/163* (2013.01); *B29C 73/02* (2013.01); *C08K 5/053* (2013.01); *C08L 7/02* (2013.01); *C08L 21/02* (2013.01); *C09K 3/10* (2013.01); *B29L 2030/00* (2013.01)

(58) Field of Classification Search
CPC ....... B29C 73/16; B29C 73/163; B29C 73/02; B29K 2007/00; B29L 2030/00; C08K 5/053; C08L 7/02; C08L 21/02; C09K 3/10

See application file for complete search history.

(56) References Cited

U.S. PATENT DOCUMENTS

| | | | |
|---|---|---|---|
| 6,283,172 B1 * | 9/2001 | Thurner | B29C 73/166 141/114 |
| 8,772,370 B1 * | 7/2014 | Sulemanji | B29C 73/163 523/166 |
| 9,260,642 B2 * | 2/2016 | Lam | C09K 3/12 |
| 9,676,979 B2 * | 6/2017 | Okamatsu | B29C 73/163 |
| 9,862,156 B2 * | 1/2018 | Sulemanji | B29C 73/163 |
| 9,919,484 B2 * | 3/2018 | Okamatsu | C08C 1/02 |
| 9,963,620 B2 * | 5/2018 | Sulemanji | C09J 107/02 |
| 10,208,231 B2 * | 2/2019 | Spindler | C09J 107/02 |
| 10,245,795 B2 * | 4/2019 | Okamatsu | B29C 73/163 |
| 10,414,907 B2 * | 9/2019 | Takahara | C08L 7/02 |
| 10,654,231 B2 * | 5/2020 | Dowel | B29C 73/163 |
| 2013/0172465 A1 * | 7/2013 | Okamatsu | B29C 73/163 524/388 |
| 2016/0040052 A1 * | 2/2016 | Okamatsu | B29C 73/163 524/388 |
| 2016/0311183 A1 * | 10/2016 | Sulemanji | B29C 73/163 |
| 2018/0304564 A1 * | 10/2018 | Dowel | B29C 73/163 |
| 2020/0086594 A1 * | 3/2020 | Okamatsu | C09K 3/10 |

FOREIGN PATENT DOCUMENTS

| | | |
|---|---|---|
| JP | 2011-162681 A | 8/2011 |
| WO | WO-2017075673 A1 * | 5/2017 ........... B29C 73/163 |

* cited by examiner

*Primary Examiner* — Anthony J Green
(74) *Attorney, Agent, or Firm* — Carrier Blackman & Associates, P.C.; William D. Blackman; Joseph P. Carrier

(57) ABSTRACT

An object of the present invention is to provide a tire sealant that excels in injectability while maintaining sealing performance and storage performance at an excellent level, and to provide a tire repair kit. Provided are a tire sealant containing a rubber latex and an anti-freezing agent, wherein the anti-freezing agent contains glycerin and at least one type of glycol-based compound selected from the group consisting of glycols and glycol ethers; the content of the glycerin is from 2 to 50 mass % of the total amount of the anti-freezing agent; and a tire repair kit that includes the tire sealant.

9 Claims, 1 Drawing Sheet

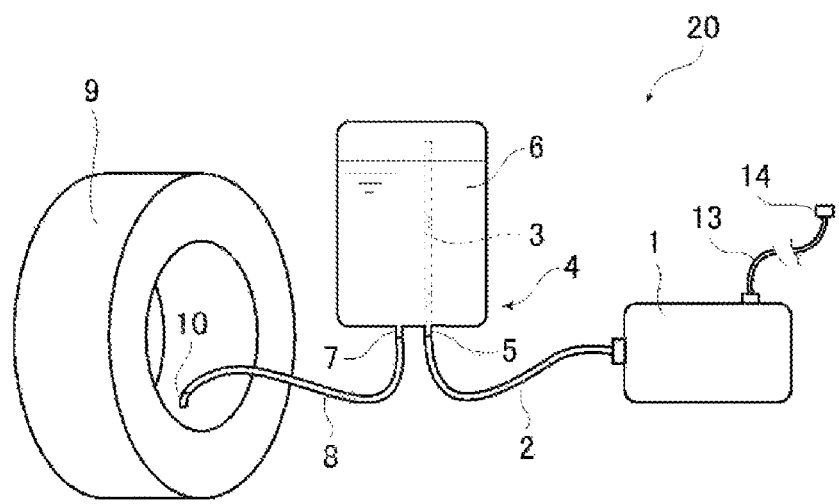

TIRE SEALANT AND TIRE REPAIR KIT

TECHNICAL FIELD

The present invention relates to a tire sealant and a tire repair kit.

BACKGROUND ART

In recent years, there has been an increase in instances where a puncture repair kit is introduced as standard equipment or optional equipment in an automobile. As puncture repair kits, kits that combine a tire sealant and a compressor, and the like in a compact package are known.

When a tire is punctured, the tire sealant can be injected into the tire from a tire valve using a compressor or such to thereby render the tire once again in a drivable state.

As the tire sealant, for example, sealants containing a natural rubber latex, a synthetic resin emulsion and an anti-freezing agent have been proposed (see Patent Document 1, for example).

Patent Document 1 describes a tire puncture sealing material that contains a natural rubber latex, an ethylene-vinyl acetate resin emulsion, a polyolefin emulsion, and an anti-freezing agent, with the solid content mass ratio between the natural rubber latex and the ethylene-vinyl acetate resin emulsion ((natural rubber)/(ethylene-vinyl acetate resin) being from 15/85 to 80/20, and the amount of solid content of the polyolefin emulsion being from 0.5 to 10 parts by mass per 100 parts by mass of the total solid content of the natural rubber latex and the ethylene-vinyl acetate resin emulsion.

CITATION LIST

Patent Literature

Patent Document 1: JP 2011-162681 A

SUMMARY OF INVENTION

Technical Problem

As described above, tire sealants are provided as standard or optional equipment in automobiles, and are stored for long periods of time in automobiles, and therefore storage performance is required.

Furthermore, in recent years, a demand has arisen for maintaining sealing performance while decreasing the amount of the tire sealant (for example, to around two-thirds the known amount).

In the midst of such circumstances, the present inventors referenced Patent Document 1, prepared a tire sealant containing a rubber latex and an anti-freezing agent, and evaluated the tire sealant. The present inventors found that a possibility existed for being able to further improve the injectability of a tire sealant while maintaining the sealing performance and storage performance of the tire sealant at an excellent level.

Therefore, an object of the present invention is to provide a tire sealant that excels in injectability (for example, the ease of injection into a tire valve, and a short injection time) while maintaining sealing performance and storage performance at an excellent level.

Another object of the present invention is to provide a tire repair kit.

Solution to Problem

The present inventors conducted diligent research to solve the above-mentioned problem, and as a result, discovered that the desired effect can be obtained by a tire sealant that contains a rubber latex and a prescribed anti-freezing agent with the content of the prescribed anti-freezing agent being within a specific range, and thereby arrived at the present invention.

The present invention is based on the findings described above and, specifically, solves the problem described above by the following features.

1. A tire sealant containing:
   a rubber latex; and
   an anti-freezing agent;
   the anti-freezing agent including glycerin and at least one type of glycol-based compound selected from the group consisting of glycols and glycol ethers; and
   the content of the glycerin being from 2 to 50 mass % of the total amount of the anti-freezing agent.

2. The tire sealant according to the above-mentioned 1, wherein the glycols are at least one type selected from the group consisting of ethylene glycol, propylene glycol, 1,3-propanediol and diethylene glycol.

3. The tire sealant according to the above-mentioned 1 or 2, wherein the glycol ethers are compounds expressed by Formula (1).

[Chemical Formula 1]

$$R_{12}\text{—}O\text{+}(CH_2CH_2O)\text{+}_p R_{11} \qquad (1)$$

In Formula (1), $R_{11}$ represents a hydrogen atom or an alkyl group, $R_{12}$ represents an alkyl group, and p represents an integer of 1 or greater.

4. The tire sealant according to any one of the above-mentioned 1 to 3, wherein the rubber latex is a natural rubber latex.

5. The tire sealant according to any one of the above-mentioned 1 to 4, further containing a synthetic resin emulsion, a mass ratio of a content 1 of the solid content of the rubber latex to a content 2 of the solid content of the synthetic resin emulsion being from 90/10 to 30/70.

6. The tire sealant according to the above-mentioned 5, wherein the synthetic resin emulsion contains at least one type selected from the group consisting of ethylene-vinyl acetate copolymer emulsions and ethylene-vinyl acetate-vinyl versatate copolymer emulsions.

7. A tire repair kit containing the tire sealant according to any one of the above-mentioned 1 to 6 and a compressor.

Advantageous Effects of Invention

The tire sealant according to an embodiment of the present invention excels in injectability while maintaining sealing performance and storage performance at an excellent level.

The tire repair kit according to an embodiment of the present invention excels in the injectability of the tire sealant while maintaining sealing performance and storage performance at an excellent level.

BRIEF DESCRIPTION OF DRAWINGS

The drawing FIGURE is a schematic view that schematically illustrates an example of a method of using the tire repair kit of the present invention.

DESCRIPTION OF EMBODIMENTS

The present invention is described in detail below.

Furthermore, in the present specification, the term "(meth) acrylic" refers to acrylic or methacrylic.

Furthermore, in the present specification, numerical ranges indicated using "(from) . . . to . . . " include the former number as a lower limit value and the latter number as an upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, cases where at least one of the sealing performance, storage performance, and injectability is more superior may be referred to as "exhibiting a more superior effect of the present invention".

In the present invention, the rubber latex contains rubber as a dispersoid, and a dispersion medium, and the rubber is dispersed in the dispersion medium. The synthetic resin emulsion contains a synthetic resin as a dispersoid, and a dispersion medium, and the synthetic resin is dispersed in the dispersion medium. In general, in the present invention, the term emulsion includes a suspension (a system in which a solid phase dispersoid is dispersed in a liquid phase dispersion medium) and a system in which a liquid phase dispersoid is dispersed in a liquid phase dispersion medium.

The dispersion medium contained in the rubber latex or synthetic resin emulsion is not particularly limited. Examples include water, and a mixture of water and an organic solvent that is soluble in water.

In the present invention, the solid content of the rubber latex refers to rubber. The content of the solid content of the rubber latex refers to the content of the rubber contained in the rubber latex, or to the total content of components other than the dispersion medium of the rubber latex. In the rubber latex, the content of the rubber contained in the rubber latex, and the total content of components other than the dispersion medium of the rubber latex are nearly the same.

In the present invention, the solid content of the synthetic resin emulsion means a synthetic resin. The content of the solid content of the synthetic resin emulsion refers to the content of the synthetic resin contained in the synthetic resin emulsion, or to the total content of components other than the dispersion medium of the synthetic resin emulsion. In the synthetic resin emulsion, the content of the synthetic resin contained in the synthetic resin emulsion, and the total content of components other than the dispersion medium of the synthetic resin emulsion are nearly the same.

Tire Sealant

The tire sealant according to an embodiment of the present invention contains: a rubber latex; and
an anti-freezing agent;
the anti-freezing agent including glycerin and at least one type of glycol-based compound selected from the group consisting of glycols and glycol ethers; and
the content of the glycerin being from 2 to 50 mass % of the total amount of the anti-freezing agent.

The tire sealant according to an embodiment of the present invention is thought to achieve the desired effects as a result of having such a configuration. Although the reason is not clear, it is assumed to be as follows.

As described above, ordinary tire sealants are injected into a tire from a tire valve using a compressor or the like. The present inventors deduced that when the tire sealants are injected, the propylene glycol or other anti-freezing agent in the tire sealant approaches near the surface of the rubber (natural rubber, for example) used as a dispersoid, the dispersal of the rubber becomes unstable, the rubber agglomerates, and as a result, the injectability of the tire sealant into the tire worsens.

In contrast, the present inventors deduced that when the tire sealant according to an embodiment of the present invention is injected into a tire from a tire valve, the glycerin in the tire sealant pulls the propylene glycol and other glycol-based compounds away from the surface of the rubber that is used as a dispersoid, the dispersibility of the rubber can be stably maintained, and as a result, the tire sealant according to an embodiment of the present invention excels in terms of injectability into the tire. This is thought to occur because glycerin has a higher affinity to water than propylene glycol and other glycol-based compounds.

Furthermore, the present inventors discovered that by using as the anti-freezing agent, a predetermined glycol-based compound in combination with glycerin, and maintaining the content of the glycerin to within a specific range, the tire sealant not only excels in injectability, but can also balance sealing performance, storage performance and injectability at a high level.

Hereinafter, each component contained in the tire sealant according to an embodiment of the present invention is described in detail.

Rubber Latex

The rubber latex contained in the tire sealant according to an embodiment of the present invention is not particularly limited, and a known rubber latex can be used.

Specific examples of the rubber latex include a natural rubber latex, chloroprene latex, styrene-butadiene rubber latex, acrylonitrile butadiene rubber latex, and styrene-butadiene acrylic rubber latex. Among these, a natural rubber latex is preferable from the perspective of being more superior in sealing performance.

The natural rubber latex is not particularly limited. Examples of the natural rubber latex include natural rubber latexes from which protein has not been removed, and natural rubber latexes from which protein has been removed.

The method of manufacturing the rubber latex is not particularly limited.

Anti-Freezing Agent

The anti-freezing agent contained in the tire sealant according to an embodiment of the present invention includes glycerin and at least one type of glycol-based compound selected from the group consisting of glycols and glycol ethers.

Glycol-Based Compounds

In the present invention, the glycol-based compound is at least one type selected from the group consisting of glycols and glycol ethers.

More superior injectability is obtained when a combination of glycols and glycerin is used as the anti-freezing agent.

Glycols

The glycols are compounds which have an aliphatic hydrocarbon group and two hydroxy groups, and in which the hydroxy group is bonded to the aliphatic hydrocarbon group, and some of the carbon atoms configuring the aliphatic hydrocarbon group may be substituted with oxygen atoms.

The aliphatic hydrocarbon group may be a straight-chain, a branched-chain, or a cyclic group or may be a combination thereof.

An example of a preferable aspect of the aliphatic hydrocarbon group is a saturated aliphatic hydrocarbon group.

For cases in which some of the carbon atoms of the aliphatic hydrocarbon group are substituted with oxygen atoms, an example of a preferable aspect is one in which the oxygen atoms form ether bonds.

Examples of the glycols include compounds represented by Formula (2).

$$HO—R_{21}—OH \quad (2)$$

In Formula (2), $R_{21}$ represents an aliphatic hydrocarbon group, and some of the carbon atoms configuring the aliphatic hydrocarbon group may be substituted with oxygen atoms. Similar to the description above, some of the carbon atoms configuring the aliphatic hydrocarbon group may be substituted with oxygen atoms.

Examples of the above-mentioned $R_{21}$ are groups represented by Formula (3).

$$*—R_{31}\text{-}(O—R_{32})_{m31}—* \quad (3)$$

In Formula (3), $R_{31}$ and $R_{32}$ each independently represent an aliphatic hydrocarbon group, m31 is 0 or an integer of 1 or greater, and * indicates the bonding position with the hydroxy group.

The aliphatic hydrocarbon groups of $R_{31}$ and $R_{32}$ are preferably configured only by carbon atoms and hydrogen atoms. The number of carbons in the aliphatic hydrocarbon groups of $R_{31}$ and $R_{32}$ is preferably 1 or greater and is more preferably 2 or 3. Examples of the aliphatic hydrocarbon groups of $R_{31}$ and $R_{32}$ include an ethylene group, a propylene group, and a trimethylene group. $R_{31}$ and $R_{32}$ may be the same or different.

m31 is preferably 0 or 1.

Examples of the glycols include alkylene glycol and polyalkylene glycol.

The alkylene group in the alkylene glycol or polyalkylene glycol may be a straight-chain, a branched-chain, or a cyclic group or may be a combination thereof, and a preferable aspect is a straight-chain or a branched-chain.

Specific examples of the glycols include ethylene glycol, propylene glycol (1,2-propanediol), 1,3-propanediol and other such alkylene glycols; and diethylene glycol, dipropylene glycol and other such polyalkylene glycols.

From the perspective of achieving a more superior effect of the present invention, the glycols are preferably at least one type selected from the group consisting of ethylene glycol, propylene glycol, 1,3-propanediol and diethylene glycol.

From the perspective of achieving more superior sealing performance and storage performance, the combination of glycols and glycerin is preferably a combination of propylene glycol and glycerin.

Note that in the present invention, the glycols do not include the below-described glycol ethers.

Glycol Ethers

Glycol ethers are compounds for which one or both of the two hydroxy groups of the above-mentioned glycols are substituted with —OR.

R in the above-mentioned —OR is favorably a hydrocarbon group. Examples of the hydrocarbon group include aliphatic hydrocarbon groups, aromatic hydrocarbon groups, and combinations thereof. Among these, aliphatic hydrocarbon groups are preferable. The aliphatic hydrocarbon group may be a straight-chain, a branched-chain, or a cyclic group or may be a combination thereof. An example of a preferable aspect of the aliphatic hydrocarbon group is a saturated aliphatic hydrocarbon group.

Examples of the glycol ethers include compounds represented by Formula (4).

$$X_{41}O—R_{41}—OX_{42} \quad (4)$$

In Formula (4), $R_{41}$ represents an aliphatic hydrocarbon group, and some of the carbon atoms configuring the aliphatic hydrocarbon group may be substituted with oxygen atoms. Similar to the description above, some of the carbon atoms configuring the aliphatic hydrocarbon group may be substituted with oxygen atoms.

$X_{41}$ and $X_{42}$ each independently represent a hydrogen atom or an R in the above-mentioned —OR. Note that a case in which $X_{41}$ and $X_{42}$ are simultaneously hydrogen atoms is excluded. The above-mentioned R is synonymous with that described above. Preferably, one of $X_{41}$ and $X_{42}$ is a hydrogen atom, and the other is R. For a case in which $X_{41}$ and $X_{42}$ are R, the two R may be the same or different.

Examples of the above-mentioned $R_{41}$ include groups represented by Formula (5) below.

$$*—R_{51}—(O—R_{52})_{m51}—* \quad (5)$$

In Formula (5), $R_{51}$ and $R_{52}$ each independently represent an aliphatic hydrocarbon group, m51 is 0 or an integer of 1 or greater, and * indicates the bonding position.

The aliphatic hydrocarbon groups of $R_{51}$ and $R_{52}$ are preferably configured only by carbon atoms and hydrogen atoms. The number of carbons in the aliphatic hydrocarbon groups of $R_{51}$ and $R_{52}$ is preferably from 1 to 5 and is more preferably 2 or 3. Examples of the aliphatic hydrocarbon groups of $R_{51}$ and $R_{52}$ include an ethylene group, a propylene group, and a trimethylene group. $R_{51}$ and $R_{52}$ may be the same or different.

m51 is preferably 0, 1 or 2, and is more preferably 1 or 2.

Examples of the glycol ethers include compounds represented by Formula (1)

[Chemical Formula 2]

$$R_{12}—O\text{-}(CH_2CH_2O\text{-})_p R_{11} \quad (1)$$

In Formula (1), $R_{11}$ represents a hydrogen atom or an alkyl group, $R_{12}$ represents an alkyl group, and p represents an integer of 1 or greater.

The alkyl groups of $R_{11}$ and $R_{12}$ are not particularly limited. Although the alkyl group may be a straight-chain, a branched-chain, or a cyclic alkyl group, the alkyl group is preferably a straight-chain alkyl group.

The number of carbons in the alkyl groups of $R_{11}$ and $R_{12}$ is preferably from 1 to 6, and more preferably from 1 to 5.

Examples of the alkyl groups of $R_{11}$ and $R_{12}$ include a methyl group, an ethyl group, a propyl group, a butyl group, a pentyl group, and a hexyl group. For cases in which $R_{11}$ and $R_{12}$ are alkyl groups, $R_{11}$ and $R_{12}$ may be the same or different.

In Formula (1), $R_{11}$ represents a hydrogen atom or an alkyl group. Of these, $R_{11}$ is preferably a hydrogen atom.

In Formula (1), $R_{12}$ represents an alkyl group. The alkyl group is synonymous with that described above.

In Formula (1), p is an integer of 1 or greater. In particular, p is preferably an integer of 2 or greater, and more preferably an integer of 2 or 3.

Examples of the glycol ethers include alkylene glycol monoether, alkylene glycol diether, polyalkylene glycol monoether, and polyalkylene glycol diether.

Specific examples of the glycol ethers include ethylene glycol monomethyl ether, ethylene glycol monopropyl ether, ethylene glycol monobutyl ether, propylene glycol monomethyl ether, 1,3-propanediol monomethyl ether and other such alkylene glycol monoalkyl ethers; ethylene glycol dimethyl ether, ethylene glycol dipropyl ether, ethylene glycol dibutyl ether, propylene glycol dimethyl ether, 1,3-propanediol dimethyl ether and other such alkylene glycol dialkyl ethers; diethylene glycol monomethyl ether, triethylene glycol monomethyl ether and other such polyalkylene glycol monoalkyl ethers; and diethylene glycol dimethyl ether, triethylene glycol dimethyl ether and other such polyalkylene glycol dialkyl ethers.

Note that in the present invention, an example of a preferable aspect is one in which the glycol-based compound does not contain a surfactant.

Content of Glycol-Based Compound

From the perspective of achieving a more superior effect (particularly sealing performance) of the present invention, the content of the glycol-based compound is preferably from 50 to 98 mass %, and more preferably from 60 to 95 mass %, of the total amount of the anti-freezing agent.

Glycerin

The tire sealant according to an embodiment of the present invention contains glycerin as an anti-freezing agent.

In an embodiment of the present invention, the content of the glycerin is from 2 to 50 mass % of the total amount of the anti-freezing agent. When the content is 2 mass % or greater, the tire sealant according to an embodiment of the present invention excels in the balance among sealing performance, storage performance, and injectability. When the content is 50 mass % or less, the tire sealant according to an embodiment of the present invention excels in injectability. It is surmised that this is because the viscosity of the tire sealant can be set to an appropriate range.

From the perspective of achieving a more superior effect of the present invention with an excellent balance among sealing performance, storage performance, and injectability, the content is preferably from 5 to 40 mass % of the total amount of the anti-freezing agent.

Synthetic Resin Emulsion

The tire sealant according to an embodiment of the present invention preferably further contains a synthetic resin emulsion from the perspective of achieving more superior sealing performance and storage performance.

The synthetic resin emulsion contained in the tire sealant according to an embodiment of the present invention is not particularly limited.

An example of the synthetic resin emulsion is a vinyl acetate-based polymer emulsion.

The vinyl acetate-based polymer emulsion is not particularly limited as long as the vinyl acetate-based polymer contained in the emulsion is a polymer having a repeating unit derived from vinyl acetate.

Vinyl Acetate-Based Polymer Emulsion

The vinyl acetate-based polymer contained in the vinyl acetate-based polymer emulsion may be either a homopolymer or a copolymer of vinyl acetate.

In a case where the vinyl acetate-based polymer is a copolymer, the monomer other than the vinyl acetate is not particularly limited as long as it is a compound having an ethylenically unsaturated bond. Examples include ethylene and other such olefins; Veova (an ester of versatic acid and vinyl alcohol; also called vinyl versatate); esters of (meth)acrylic acid, (meth)acrylic acid and other such (meth)acrylic-based monomers; and styrene and other such aromatic vinyl compounds.

Examples of the vinyl acetate-based polymer emulsion include vinyl acetate homopolymer emulsions and vinyl acetate-based copolymer emulsions.

Examples of the vinyl acetate-based copolymer emulsions include ethylene-vinyl acetate copolymer emulsions, ethylene-vinyl acetate-vinyl versatate copolymer emulsions, ethylene-vinyl acetate-vinyl versatate-(meth)acrylic-based monomer copolymer emulsions, and other such ethylene-vinyl acetate-based copolymer emulsions.

From the perspective of achieving a more superior effect (particularly storage performance and sealing performance) of the present invention, the synthetic resin emulsion is preferably a vinyl acetate-based copolymer emulsion and is more preferably at least one type selected from the group consisting of ethylene-vinyl acetate copolymer emulsions and ethylene-vinyl acetate-vinyl versatate copolymer emulsions. Furthermore, from the perspective of excelling even further in sealing performance, ethylene-vinyl acetate-vinyl versatate copolymer emulsions are preferable.

The method for producing the synthetic resin emulsion is not particularly limited. A commercially available product can be used for the synthetic resin emulsion.

Content 1 of solid content of rubber latex: case in which tire sealant according to embodiment of present invention does not contain synthetic resin emulsion From the perspective of achieving a more superior effect (particularly, sealing performance) of the present invention, the content 1 of the solid content of the rubber latex is preferably from 30 to 60 mass %, and more preferably from 35 to 45 mass %, of the total amount of the tire sealant.

Total amount of content 1 of solid content of rubber latex and content 2 of solid content of synthetic resin emulsion: case in which tire sealant according to embodiment of present invention contains synthetic resin emulsion From the perspective of achieving a more superior effect of the present invention, the total amount of the content 1 of the solid content of the rubber latex and the content 2 of the solid content of the synthetic resin emulsion is preferably from 30 to 60 mass %, and more preferably from 35 to 45 mass %, of the total amount of the tire sealant.

Mass ratio of content 1 of solid content of rubber latex to content 2 of solid content of synthetic resin emulsion for case in which tire sealant according to embodiment of present invention further contains synthetic resin emulsion From the perspective of achieving a more superior effect of the present invention and being able to achieve excellent sealing performance while maintaining a low viscosity at low temperatures, the mass ratio of the content 1 of the solid content of the rubber latex to the content 2 of the solid content of the synthetic resin emulsion ((content 1 of solid content of rubber latex)/(content 2 of solid content of synthetic resin emulsion)) is preferably from 90/10 to 30/70, and more preferably from 80/20 to 40/60.

Amount of Water Contained in Tire Sealant

From the perspective of achieving a more superior effect (particularly, sealing performance) of the present invention, the content of water (total amount of water) in the tire sealant according to an embodiment of the present invention is preferably from 20 to 50 mass %, and more preferably from 23 to 38 mass %, of the total amount of the tire sealant.

Other Components

In addition to the components mentioned above, the tire sealant according to an embodiment of the present invention can further contain, as desired, additives such as anti-freezing agents besides the above-mentioned glycol-based compounds and glycerin (hereinafter, also referred to as anti-freezing agent besides glycol-based compounds, etc.), surfactants, gelling agents, fillers, anti-aging agents, antioxidants, pigments, plasticizers, thixotropic agents, UV absorbents, flame retardants, dispersants, dehydrating agents, and antistatic agents.

Surfactant

The surfactant that can be further contained in the tire sealant according to an embodiment of the present invention is not particularly limited. For example, the surfactant can be a nonionic, anionic, cationic, or amphoteric surfactant.

Examples of the nonionic surfactant include polyoxyethylene alkylamine, polyoxyethylene alkylamide, polyoxyethylene fatty acid ester, polyoxyethylene castor oil, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, fatty acid alkanolamide, and other such nonionic surfactants. The HLB of the nonionic surfactant is preferably in a range from 12.0 to 19.0.

The term HLB refers to a value that is calculated by the Oda's equation on the basis of an organic conceptual diagram, and this calculation method is described, for example, in "Techniques of Emulsification and Solubilization" (1976, published by Kougakutosho Ltd.). In addition, the organic value and the inorganic value for deriving the HLB can be calculated using the table of inorganic groups (1974, values reported by Fujita et al.) described in "Organic Conception Diagram—Basis and Applications—" (1984, published by Sankyo Shuppan Co., Ltd.).

Examples of the anionic surfactant include alkyl sulfates (for example, sodium lauryl sulfate), alkyl ether sulfates, polyoxyethylene alkyl ether sulfates, polyoxyethylene alkyl phenyl ether sulfates, alkylbenzene sulfonates, alkylnaphthalene sulfonates, salts of higher fatty acids (soaps), α-sulfo fatty acid methyl ester salts, α-olefin sulfonates, alkane sulfonates, (mono) alkyl phosphates, polyoxy-mono and di-styryl phenylether monoester sulfosuccinates, and alkyl phenoxy polyoxyethylene propyl sulfonates.

Examples of the cationic surfactant include tetraalkyl ammonium chloride, trialkyl benzyl ammonium chloride, alkylamines, monoxyethylene alkylamines, and polyoxyethylene alkylamines.

The surfactant preferably includes a nonionic surfactant and an anionic surfactant.

From the perspective of achieving a more superior effect of the present invention (particularly, storage performance and so-called valve injectability at high temperatures) and the excellent stabilization of the rubber latex, for cases in which a nonionic surfactant and an anionic surfactant are used in combination, the mass ratio of the nonionic surfactant to the anionic surfactant (nonionic surfactant/anionic surfactant) is preferably from 1.0/1.0 to 1.0/10.0.

From the perspective of achieving a more superior effect of the present invention (particularly, storage performance), the amount of the surfactant (the total amount for cases in which surfactants are used in combination) is preferably from 3 to 20 parts by mass per 100 parts by mass of the solid content of the rubber latex.

Anti-Freezing Agent Besides Glycol-Based Compounds, and the Like

Examples of the anti-freezing agent besides glycol-based compounds, and the like include alcohols having one hydroxy group such as methanol and ethanol; and trihydric and higher alcohols besides glycerin.

In the present invention, the content of the anti-freezing agent besides glycol-based compounds, and the like is preferably 0 mass % of the total amount of the anti-freezing agent.

In the present invention, an example of a preferable aspect is one in which the anti-freezing agent is only the glycol-based compound and glycerin.

Production Method

The method of producing the tire sealant according to an embodiment of the present invention is not particularly limited. For example, a method can be used in which a rubber latex, a predetermined anti-freezing agent, and as necessary, a synthetic resin emulsion or additives are mixed thoroughly using a combination mixer or other mixers.

Water may also be added, as necessary, to the system.

Viscosity

From the perspective of excelling at injectability at low temperatures, the viscosity at −30° C. of the tire sealant according to an embodiment of the present invention is preferably 1500 mPa·s or less.

The temperature when using the tire sealant according to an embodiment of the present invention is not particularly limited, and for example, can be in a range from −45° C. to +70° C.

Tire Repair Kit

The tire repair kit according to an embodiment of the present invention is a tire repair kit having the tire sealant according to an embodiment of the present invention and a compressor.

The tire sealant used in the tire repair kit according to an embodiment of the present invention is not particularly limited as long as it is a tire sealant according to an embodiment of the present invention. The tire sealant is favorably stored in a container. A preferable aspect is one in which the container is pressure resistant.

The compressor used in the tire repair kit according to an embodiment of the present invention is not particularly limited. For example, the compressor may be an air compressor. A preferable aspect is one in which the compressor has a pressure gauge (for example, an air pressure gauge).

An example of a preferable aspect is one in which the tire repair kit further has two hoses.

Tire Repair Kit Use Method

The method for using the tire repair kit according to an embodiment of the present invention will be described below using the attached drawing. The tire repair kit according to an embodiment of the present invention and the use method thereof are not limited to the attached drawing.

The drawing FIGURE is a schematic view that schematically illustrates an example of a method of using the tire repair kit of the present invention.

In FIG. 1, a tire repair kit 20 includes a container 4 and a compressor 1, and a tire sealant 6 is contained in the container 4.

The container 4 includes an opening portion 5 through which air delivered from the compressor 1 enters the container 4, a nozzle 3 connected to the opening portion 5, and a discharge portion 7. The container 4 is pressure resistant.

The compressor 1 includes an electric cable 13 and a plug 14. The plug 14 is connected to an accessory socket inside the vehicle. The compressor 1 also includes a pressure gauge.

The tire repair kit 20 includes hoses 2 and 8.

When a tire is punctured, first, one end of the hose 2 is connected to the compressor 1, the other end of the hose 2 is connected to the opening portion 5, and the container 4 and the compressor 1 are connected.

Also, the discharge portion 7 and one end of the hose 8 are connected, the other end of the hose 8 is connected to a valve 10 of a tire 9, and the container 4 and the tire 9 are thereby connected.

Next, a switch of the compressor 1 is turned to ON to drive the compressor 1, and air is sent from the compressor 1. Air that is sent from the compressor 1 passes through the hose 2, the opening portion 5, and the nozzle 3, and is fed into the container 4. The internal pressure of the container 4 is gradually increased by the air that is fed therein, and when the internal pressure of the container 4 increases to reach a certain level, the air introduced into the container 4 extrudes the tire sealant 6.

In the present invention, the matter of the tire sealant beginning to be extruded from the container is referred to as the "startup of tire sealant injection".

The extruded tire sealant passes through the discharge portion 7, through the hose 8, and through the valve 10, and is injected into the tire 9.

In the present invention, the matter of the tire sealant being fully injected into the tire is referred to as the "completion of tire sealant injection". When the tire sealant is entirely injected into the tire, the pressure indicated by the pressure gauge temporarily decreases.

By configuring in this manner, the entire amount of the tire sealant in the container can be flowed into the tire interior.

Thereafter as well, the compressor 1 is driven continuously, air from the compressor 1 is fed to the tire 9, and the tire 9 is inflated.

After the air has sufficiently inflated the tire 9, and the pressure gauge value (internal pressure of the tire) has reached a predetermined value (250 kPa, for example) or higher, the switch of the compressor 1 is turned to OFF, and the compressor 1 is stopped. In an embodiment of the present invention, after the injection of the tire sealant has been completed, the internal pressure of the tire has exceeded a predetermined value, and the compressor has been stopped, the pressure indicated by the pressure gauge is referred to as the "pressure after stopping the compressor".

After the compressor is stopped, the hose 8 is removed from the valve 10 (if possible, a cap is secured onto the valve 10), and the vehicle is immediately driven. Driving, for example, at 80 km per hour or slower is preferred. Through the driving, the tire sealant inside the tire 9 can seal the puncture hole.

In a case where the internal pressure of the tire after the driving is insufficient, the compressor is connected once again to the tire and operated, and the tire is filled with air until the internal pressure of the tire reaches a necessary level.

Note that in the drawing FIGURE, the opening portion 5 and the discharge portion 7 are located at the lower side of the container 4, but with respect to an embodiment of the present invention, the container may be placed so that the opening portion and the discharge portion are located at the upper side of the container. In this case, the nozzle is preferably connected to the discharge portion inside the container. From the perspective of being able to inject the tire sealant into the tire without any waste, preferably, the length of the nozzle that is connected to the discharge portion is slightly shorter than the height of the container, and the tip end of the nozzle is positioned near the bottom surface inside the container.

The tire sealant according to an embodiment of the present invention or the tire repair kit according to an embodiment of the present invention can be applied to the repair of punctures of various types of pneumatic tires. Examples of such tires include automobile tires, two-wheeled vehicle tires, one-wheeled vehicle tires, wheelchair tires, and tires for automobiles used in agricultural operations and gardening operations.

EXAMPLES

The present invention is described below in detail using examples but the present invention is not limited to such examples.

Production of Tire Sealant

The components shown in Table 1 below were used at the compositions (part by mass) shown in the same table, and mixed using an agitator to produce tire sealants.

Note that in Table 1, the upper numeric FIGURES in the NR latex row indicate the amount of NR latex, and the lower numeric FIGURES in parentheses in the NR latex row indicate the content of the solid content of the NR latex. The same applies to the synthetic resin emulsion 1.

Evaluation

The following evaluations were performed using the tire sealants produced as described above. The results are shown in Table 1.

Sealing Performance Evaluation: Puncture Repair Distance
Sealing Performance Evaluation Method A puncture hole (diameter: 4 mm) was made in the shoulder groove portion of the tread of a 215/60 R16 tire.

Next, the punctured tire was mounted on a drum testing machine, 350 mL of the tire sealant produced as described above was injected through the tire valve, and the tire was then filled with air until the internal pressure of the tire reached 200 kPa.

The tire was then subjected to the repetition of intermittent driving, in which the tire was driven at a speed of 30 km/h under a load of 350 kg and then stopped, until the puncture hole was sealed and there was no air leakage, and the distance (puncture repair distance) at which the puncture hole was sealed was measured. The presence or lack of air leakage was confirmed by spraying the portion of the puncture hole with soapy water and checking for any formation of bubbles from the soapy water.

Sealing Performance Evaluation Criteria

Cases where the above-mentioned puncture repair distance was 5 km or less were evaluated as exhibiting extremely excellent sealing performance and were indicated by "A".

Cases where the puncture repair distance exceeded 5 km but was not more than 10 km were evaluated as exhibiting excellent sealing performance and were indicated by "B".

Cases where the puncture repair distance exceeded 10 km were evaluated as exhibiting poor sealing performance and were indicated by "C".

Storage Performance
Storage Performance Evaluation Method

An amount of 350 mL of the tire sealant produced as described above was inserted into a container.

A high temperature vibration test in which a vibration load with an amplitude of ±1.5 mm was applied to the container for 168 hours under a condition of 80±2° C. was conducted.

The state of the tire sealant inside the container was visually observed before and after the test. In addition, for cases in which aggregates were not visually confirmed in the tire sealant after the above-mentioned test, after the test, the post-testing tire sealant was filtered with a 100 mesh filter (nylon), the weight of the filtered matter was measured, and the amount (mass %) of the filtered matter with respect to the total amount of the tire sealant was calculated.

Storage Performance Evaluation Criteria

Cases in which aggregates were not visually observed in the tire sealant before and after the high temperature vibration tests, and the amount of filtered matter was 0.2 mass % or less of the total amount of the tire sealant were evaluated as exhibiting extremely excellent storage performance and were indicated by "A".

Cases in which aggregates were not visually observed in the tire sealant before and after the high temperature vibration tests, and the amount of filtered matter exceeded 0.2 mass % of the total amount of the tire sealant were evaluated as exhibiting excellent storage performance and were indicated by "B".

Cases in which aggregates were not visually observed in the tire sealant before the high temperature vibration tests, but aggregates were visually observed in the tire sealant after the high temperature vibration tests, were evaluated as exhibiting poor storage performance and were indicated by "C".

Injectability 1: Ease of Injection
Evaluation Method of Injectability 1

An amount of 350 mL of the tire sealant produced as described above was placed into a container, and the container was heated to 70° C.

Next, an air compressor was used as the compressor, and as the tire, a 215/60 R16 tire in which a puncture hole (diameter: 4 mm) was made in the shoulder groove portion was used. As illustrated in the drawing FIGURE, the container was oriented downwards, and was connected through hoses to the air compressor and the tire.

Next, the switch of the air compressor was turned to ON, compressed air was fed into the container from the air compressor to increase the internal pressure of the container, the pressure thereof was used to extrude the tire sealant that was heated as described above from the inside of the container, and the entire amount of the tire sealant was injected through the tire valve and into the tire.

Thereafter as well, compressed air was fed from the compressor to inflate the tire, and when the internal pressure of the tire reached 250 kPa, the switch of the air compressor was turned to OFF, and the air compressor was stopped.

After the compressor was stopped, the pressure indicated by the pressure gauge (pressure after stopping the compressor) was measured.

Evaluation Criteria of Injectability 1

Cases in which the pressure after stopping the compressor was 230 kPa or greater were evaluated as being extremely easy to inject tire sealant and air and were indicated by "A".

Cases in which the pressure after stopping the compressor was not less than 210 kPa and less than 230 kPa were evaluated as being easy to inject tire sealant and air and were indicated by "B".

Cases in which the pressure after stopping the compressor was not less than 150 kPa and less than 210 kPa were evaluated as being cases in which tire sealant could be injected, but after injection thereof, it was somewhat difficult to fill the inside of the tire with air and were indicated by "C".

Cases in which the pressure after stopping the compressor was less than 150 kPa were evaluated as being cases in which tire sealant could be injected, but after injection thereof, it was very difficult to fill the inside of the tire with air and were indicated by "D".

Injectability 2: Injection Time
Evaluation Method of Injectability 2

In the evaluation of injectability 1, the time (injection time) from the startup of tire sealant injection (startup of extrusion of the tire sealant from the container) to the completion of tire sealant injection (tire sealant is fully injected into the tire) was measured.

Evaluation Criteria of Injectability 2

A shorter injection time indicates better injectability. In the present invention, cases for which the injection time was within 40 seconds were considered to excel in injectability.

Tire Sealant Viscosity at −30° C.
Viscosity Evaluation Method

The viscosity at −30° C. of the tire sealant that was produced as described above was measured at a rotational speed of 60 rpm using a Brookfield viscometer (trade name TV-25, available from Toki Sangyo Co., Ltd., rotor No. 3).

Viscosity Evaluation Criteria

Injectability at low temperatures improves as the viscosity becomes lower. In the present invention, cases in which the viscosity of the tire sealant at −30° C. was 1500 mPa·s or less were considered to exhibit excellent injectability at low temperatures.

TABLE 1

| | | | Comparative Example | | | | | | | Example | Comparative Example | Example |
|---|---|---|---|---|---|---|---|---|---|---|---|---|
| | | | 1 | 2 | 3 | 4 | 5 | 6 | 7 | 1 | 8 | 2 |
| NR latex 1 | | | 133 (80) | 133 (80) | 133 (80) | 133 (80) | 133 (80) | 133 (80) | 133 (80) | 133 (80) | 133 (80) | 133 (80) |
| Synthetic resin emulsion 1 | | | 40 (20) | 40 (20) | 40 (20) | 40 (20) | 40 (20) | 40 (20) | 40 (20) | 40 (20) | 40 (20) | 40 (20) |
| Anti-freezing agent | Glycerin | | 100 | | | | | | | 30 | 1 | 2 |
| | Glycol-based compound | Glycols 1 (EG) | | 100 | | | | 30 | | 70 | | |
| | | Glycols 2 (PG) | | | 100 | | | 70 | 70 | | 99 | 98 |
| | | Glycol ethers 1 (MTG) | | | | 100 | | | | | | |
| | | Glycol ethers 2 (MDG) | | | | | 100 | | 30 | | | |
| Sealing performance | | | C | B | A | A | A | A | A | B | A | A |
| Storage performance | | | A | C | B | B | B | C | B | B | B | B |
| Injectability 1 (Ease of injection) | | | A | B | C | D | D | B | C | A | C | B |
| Injectability 2 (Injection time: seconds) | | | 58 | 15 | 17 | 27 | 24 | 16 | 20 | 20 | 17 | 18 |
| Viscosity of tire sealant at −30° C. (units: mPa · s) | | | 2000 | 450 | 1100 | 650 | 500 | 900 | 870 | 1050 | 1100 | 1100 |

| | Example | | | | Comparative Example | Example | | |
|---|---|---|---|---|---|---|---|---|
| | 3 | 4 | 5 | 6 | 9 | 7 | 8 | 9 |

TABLE 1-continued

Table 1

| | | | | | | | | | | |
|---|---|---|---|---|---|---|---|---|---|---|
| NR latex 1 | | | 133 (80) | 133 (80) | 133 (80) | 133 (80) | 133 (80) | 133 (80) | 133 (80) | 167 (100) |
| Synthetic resin emulsion 1 | | | 40 (20) | 40 (20) | 40 (20) | 40 (20) | 40 (20) | 40 (20) | 40 (20) | |
| Anti-freezing agent | Glycerin | | 5 | 30 | 40 | 50 | 70 | 30 | 30 | 30 |
| | Glycol-based compound | Glycols 1 (EG) | | | | | | | | |
| | | Glycols 2 (PG) | 95 | 70 | 60 | 50 | 30 | | | 70 |
| | | Glycol ethers 1 (MTG) | | | | | | 70 | | |
| | | Glycol ethers 2 (MDG) | | | | | | | 70 | |
| Sealing performance | | | A | A | A | B | B | A | A | B |
| Storage performance | | | A | A | A | A | A | B | B | B |
| Injectability 1 (Ease of injection) | | | A | A | A | A | A | B | B | B |
| Injectability 2 (Injection time: seconds) | | | 22 | 23 | 25 | 28 | 55 | 28 | 27 | 15 |
| Viscosity of tire sealant at −30° C. (units: mPa · s) | | | 1120 | 1300 | 1400 | 1500 | 1800 | 900 | 800 | 1000 |

Details of the components described in Table 1 are as follows.

NR rubber latex 1: natural rubber latex (Hytex HA, solid content: 60 mass %, available from Fulflex (handled by Nomura Trading Co., Ltd.))

Synthetic resin emulsion 1: ethylene-vinyl acetate-vinyl versatate copolymer emulsion (Sumikaflex 950HQ, solid content: 50 mass %, available from Sumika Chemtex Co., Ltd.)

Glycerin: available from Kao Corporation

Glycols 1 (EG): ethylene glycol (available from Sankyo Chemical Industry Co., Ltd.)

Glycols 2 (PG): propylene glycol (available from Adeka Corporation, propylene glycol for industrial use)

Glycol ethers 1 (MTG): triethylene glycol monomethyl ether (available from Nippon Nyukazai Co., Ltd.)

Glycol ethers 2 (MDG): diethylene glycol monomethyl ether (available from Nippon Nyukazai Co., Ltd.)

As is clear from the results shown in Table 1, Comparative Example 1, which did not contain a predetermined glycol-based compound, exhibited poor sealing performance. Comparative Example 1 also exhibited a long injection time and poor injectability.

Comparative Examples 2 to 7, which did not contain glycerin, exhibited poor storage performance and injectability.

Comparative Examples 8 and 9, which had contents of glycerin that were outside the prescribed range, exhibited poor injectability.

The tire sealant according to an embodiment of the present invention excelled in injectability while maintaining sealing performance and storage performance at an excellent level.

When Examples 1 to 8 and Example 9 are compared, Examples 1 to 8, which contained the rubber latex and synthetic resin emulsion, better excelled in any of sealing performance, storage performance, and injectability in comparison to Example 9, which contained the rubber latex.

When Examples 1 and 4 and Examples 7 and 8 are compared, cases (Examples 1 and 4) in which glycols were contained as the glycol-based compound exhibited shorter injection times and more excellent injectability than the cases (Examples 7 and 8) that contained glycol ethers.

When Examples 3 to 5 and Examples 2 and 6 are compared, cases (Examples 3 to 5) in which the content of glycerin was from 5 to 40 mass % of the total amount of the anti-freezing agent were able to achieve balance in sealing performance, storage performance, and injectability on a higher level than the case (Example 2) in which the content of glycerin was less than 5 mass % and the case (Example 6) in which the content of glycerin exceeded 40 mass %.

REFERENCE SIGNS LIST

1: Compressor
2, 8: Hose
3: Nozzle
4: Container
5: Opening portion
6: Tire sealant
7: Discharge portion
9: Tire
10: Valve
13: Electric cable
14: Plug
20: Tire repair kit

The invention claimed is:

1. A tire sealant comprising:
   a rubber latex;
   an anti-freezing agent; and
   a synthetic resin emulsion containing at least one emulsion selected from the group consisting of ethylene-vinyl acetate copolymer emulsions and ethylene-vinyl acetate-vinyl versatate copolymer emulsions,
   the anti-freezing agent comprising glycerin and at least one type of glycol-based compound selected from the group consisting of glycols and glycol ethers;
   a mass ratio of a solid content of the rubber latex to a solid content of the synthetic resin emulsion being in a range from 90/10 to 30/70, and
   a content of the glycerin being from 2 to 50 mass % of the total amount of the anti-freezing agent.

2. The tire sealant according to claim 1, wherein the anti-freezing agent comprises a glycol selected from the group consisting of ethylene glycol, propylene glycol, 1,3-propanediol and diethylene glycol.

3. The tire sealant according to claim 1, wherein the anti-freezing agent comprises a glycol ether which is a compound represented by Formula (1):

[Chemical Formula 1]

$$R_{12}-O-(CH_2CH_2O)_p-R_{11} \quad (1)$$

wherein $R_{11}$ represents a hydrogen atom or an alkyl group, $R_{12}$ represents an alkyl group, and p represents an integer of 1 or greater.

4. The tire sealant according to claim 1, wherein the rubber latex is a natural rubber latex.

5. The tire sealant according to claim 2, wherein the anti-freezing agent comprises a glycol ether which is a compound represented by Formula (1):

[Chemical Formula 1]

    (1)

wherein $R_{11}$ represents a hydrogen atom or an alkyl group, $R_{12}$ represents an alkyl group, and p represents an integer of 1 or greater.

6. The tire sealant according to claim 2, wherein the rubber latex is a natural rubber latex.

7. The tire sealant according to claim 3, wherein the rubber latex is a natural rubber latex.

8. The tire sealant according to claim 1, wherein the anti-freezing agent comprises at least one glycol ether selected from the group consisting of ethylene glycol monomethyl ether, ethylene glycol monopropyl ether, ethylene glycol monobutyl ether, propylene glycol monomethyl ether, alkylene glycol monoalkyl ethers; ethylene glycol dimethyl ether, ethylene glycol dipropyl ether, ethylene glycol dibutyl ether, propylene glycol dimethyl ether, alkylene glycol dialkyl ethers; diethylene glycol monomethyl ether, polyalkylene glycol monoalkyl ethers; polyalkylene glycol dialkyl ethers.

9. A tire repair kit comprising the tire sealant according to claim 1, and a compressor.

* * * * *